(12) United States Patent
Popov et al.

(10) Patent No.: US 11,881,238 B1
(45) Date of Patent: Jan. 23, 2024

(54) SECTOR MAPOUT OF LOW COERCIVITY MEDIA FOR ENHANCING AERIAL DENSITY

(71) Applicant: Western Digital Technologies, Inc., San Jose, CA (US)

(72) Inventors: Zarko Popov, Mission Viejo, CA (US); Wayne H. Vinson, Longmont, CO (US); Xing Huo, Foothill Ranch, CA (US); Mao Nishiyama, Fujisawa (JP)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/880,251

(22) Filed: Aug. 3, 2022

(51) Int. Cl.
  *G11B 27/36* (2006.01)
  *G11B 20/18* (2006.01)
  *G11B 5/596* (2006.01)
  *G11B 5/012* (2006.01)

(52) U.S. Cl.
  CPC ......... *G11B 5/59655* (2013.01); *G11B 5/012* (2013.01)

(58) Field of Classification Search
  CPC . G11B 20/1037; G11B 20/1879; G11B 27/36; G11B 20/10037; G11B 20/18; G11B 5/012; G11B 2220/20; G11B 2220/90; G11B 5/00; G11B 5/54; G11B 5/59633; G11B 15/02; G11B 19/02; G11B 19/04; G11B 2020/1826; G11B 2020/1823; G11B 20/12
  USPC ........................ 360/75, 48, 53, 31; 369/53.15
  See application file for complete search history.

(56) References Cited

U.S. PATENT DOCUMENTS

| | | | |
|---|---|---|---|
| 6,654,904 B1 | 11/2003 | Andoh et al. | |
| 6,773,556 B1 | 8/2004 | Brockie et al. | |
| 7,229,588 B2 | 6/2007 | Sandlin et al. | |
| 8,009,379 B2 | 8/2011 | Williams | |
| 8,283,622 B2 | 10/2012 | An et al. | |
| 9,025,263 B2* | 5/2015 | Dhanda ................ | G11B 5/6005 360/31 |
| 9,672,864 B2 | 6/2017 | Lammers et al. | |
| 2008/0043359 A1* | 2/2008 | Chung ............. | G11B 20/10481 360/59 |
| 2009/0052289 A1 | 2/2009 | Chen et al. | |

(Continued)

FOREIGN PATENT DOCUMENTS

KR        10-0771880 B1     11/2007

OTHER PUBLICATIONS

Li et al., "Disk Surface Dynamic Coercivity and Other Surface Parameter Measurement at Spin Stand", Journal of Magnetism and Magnetic Materials, vol. 273, 6 pages, May 2004.

*Primary Examiner* — Nabil Z Hindi
(74) *Attorney, Agent, or Firm* — Neugeboren O'Dowd PC (57) ABSTRACT

Various illustrative aspects are directed to a data storage device comprising one or more disks, an actuator assembly comprising one or more disk heads; and one or more processing devices, configured to detect a plurality of areas with a coercivity lower than a threshold on the one or more disks; map out one or more sectors in each of the plurality of lower coercivity areas on the one or more disks; write data to, or read data from, the one or more disks, based at least in part on mapping out the one or more sectors in each of the plurality of lower coercivity areas. In some embodiments, the writing or reading data comprises writing data to, or reading data from, one or more sectors of the one or more disks that are not mapped out.

21 Claims, 6 Drawing Sheets

(56) References Cited

U.S. PATENT DOCUMENTS

2015/0036235 A1    2/2015   Dhanda et al.
2022/0076700 A1    3/2022   Suzuki

* cited by examiner

SECTOR MAPOUT OF LOW COERCIVITY MEDIA FOR ENHANCING AERIAL DENSITY

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

Figure 1:
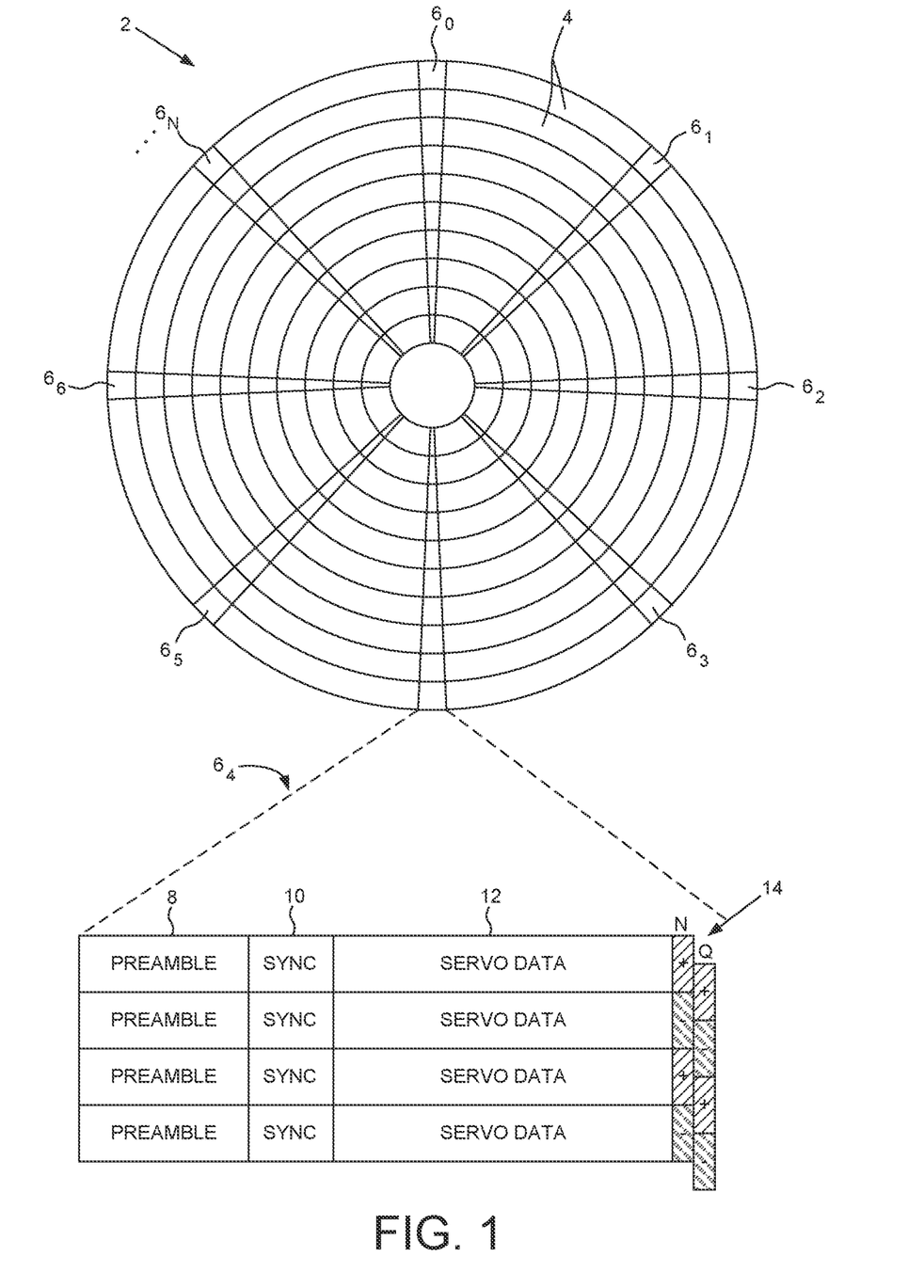
FIG. 1 shows a disk format as comprising a number of radially-spaced, concentric servo tracks defined by servo wedges recorded around the circumference of each servo track, according to various aspects of the present disclosure.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

During the manufacture of magnetic disks used in disk drives (also referred to as HDDs), the magnetic disks are physically supported by a plurality of sputtering claws during sputtering film deposition. In some circumstances, these sputtering claws (also referred to as prongs) cause a shadowing effect on the magnetic disks. For example, the sputtering film thickness at or around the regions (typically near the outer diameter or OD of the magnetic disk) where the sputtering claws hold the magnetic disk may be different from the sputtering film thickness on other regions of the magnetic disk (i.e., regions not in contact with the sputtering claws). Said another way, the media in the vicinity of the prongs/sputtering claws may be magnetically different (or have a different coercivity, Hc) from the media on other portions of the disk. In some cases, these regions of different coercivity may be located some distance inward from the outer diameter (OD) of the disk, for instance, at the regions where the sputtering claws/prongs physically contact or hold the disk. In some examples, three sputtering claws may be used during the sputtering film deposition process. In such cases, the disk may comprise three distinct regions (also referred to as sputter shadow areas or pin shadows) having a different media coercivity, Hc, as compared to other areas/regions of the disk.

In some cases, large variations in coercivity at different regions of the disk may adversely impact normal read/write operations. For example, the media at (or around) the pin shadow regions may be "magnetically soft" as compared to the media on other portions of the disk. While the media in the pin shadow regions is easier to write to, it is also susceptible to degradation/erasure (e.g., due to adjacent track interference or ATI). That is, an adjacent track write may inadvertently erase or degrade a previous track write (e.g., a previous track write in a sputter shadow area). In some examples, the data associated with the previous track write may need to be written if it was lost as a result of the current track write. In some circumstances, however, rewriting the lost data may adversely impact the data from another previous track write in the pin shadow region. This results in a cascading effect where multiple rewrites may need to be performed, which increases latency, reduces data integrity, or in some cases, makes the disk drive inoperable. One currently used technique for mitigating the effects of non-uniform media coercivity comprises using a lower aerial density (i.e., tracks per inch or TPI) near the outer diameter (OD) of the disk. While this helps reduce adjacent track interference (ATI), it also reduces the amount of data that can be written to the disk (i.e., since the low aerial density or TPI is not limited to the pin shadow regions, but everywhere in the vicinity of the OD). Furthermore, such a design also results in achievable capacity loss (ACC loss) and provides little to no mitigation against poor writes. In some examples, loss in achievable capacity may correspond to a lower average aerial density.

Broadly, aspects of the present disclosure are directed to a refined technique for enhancing net aerial density of a disk drive based on mapping out one or more sectors (or sector IDs) in the sputter shadow areas, which not only helps mitigate against ATI but also helps against poor writes, as compared to the prior art. As used herein, the term "poor write" may refer to a write, that once completed, has a low SNR, making it harder to read the data (e.g., immediately after the write), or has little to no margin towards further SNR degradation (e.g., caused as a result of ATI, or an adjacent track offtrack write event, to name two non-limiting examples). In some examples, one or more sector IDs of every other track are mapped out cross track. In some other cases, the sector IDs of every third track are mapped out cross track in the one or more sputter shadows areas. As used herein, the term "mapping out" means that the control circuitry of the data storage device refrains from writing data to/reading data from the mapped-out sectors (or sector IDs) in the sputter shadow area(s). Since the sputter shadow areas correspond to a relatively small angular section (e.g., a few percent) of the disk, mapping out the sector IDs does not drastically impact the storage capacity of the disk. Furthermore, mapping out of the sector IDs also allows a higher aerial density (or TPI) to be used near the OD of the disk, as compared to the prior art.

Various illustrative aspects are directed to a data storage device comprising one or more disks; an actuator assembly comprising one or more disk heads; and one or more processing devices. In some implementations, the one or more processing devices are configured to detect a plurality of areas with a coercivity lower than a threshold, for instance, sputter shadow areas affected by a plurality of sputtering claws during manufacturing of the one or more disks; map out one or more sectors (or sector IDs) in each of the plurality of lower coercivity areas on the one or more disks; write data to, or read data from, the one or more disks, based at least in part on mapping out the one or more sectors in each of the plurality of lower coercivity areas, and wherein the writing or reading data comprises writing data to, or reading data from, one or more sectors of the one or more disks that are not mapped out.

Various illustrative aspects are directed to a method of operating a data storage device comprising detecting, by one or more processing devices, a plurality of areas with a coercivity lower than a threshold on one or more disks; mapping out, by the one or more processing devices, one or more sectors in each of the plurality of lower coercivity areas on the one or more disks; and writing data to, or reading data from, the one or more disks, based at least in part on mapping out the one or more sectors in each of the plurality of lower coercivity areas, and wherein the writing or reading data comprises writing data to, or reading data from, one or more sectors of the one or more disks that are not mapped out.

Various illustrative aspects are directed to one or more processing devices comprising means for detecting a plurality of lower coercivity areas (e.g., areas with a coercivity lower than a threshold), means for mapping out one or more sectors in each of the plurality of lower coercivity areas on the one or more disks, and means for writing data to, or means for reading data from, the one or more disks, based at least in part on mapping out the one or more sectors in each of the plurality of lower coercivity areas, and wherein the means for writing or reading data comprises means for writing data to, or means for reading data from, one or more sectors of the one or more disks that are not mapped out.

In some examples of the data storage device, the method, and the one or more processing devices described above, each of the plurality of lower coercivity areas (e.g., sputter shadow areas) span a plurality of tracks on a corresponding disk surface of the one or more disks, and wherein mapping out the one or more sectors in each of the plurality of lower coercivity areas comprises mapping out a plurality of sectors cross-track in each of the plurality of lower coercivity areas.

In some examples of the data storage device, the method, and the one or more processing devices described above, mapping out the plurality of sectors cross-track comprises mapping out sectors of each angular region of a plurality of angular regions on the corresponding disk surface of the one or more disks, and wherein each angular region corresponds to one lower coercivity area of the plurality of lower coercivity areas.

In some examples of the data storage device, the method, and the one or more processing devices described above, mapping out the plurality of sectors cross-track comprises (1) mapping out, for every other track, sectors in each of the plurality of lower coercivity areas, or (2) mapping out, for every third track, sectors in each of the plurality of lower coercivity areas.

In some examples of the data storage device, the method, and the one or more processing devices described above, each of the plurality of lower coercivity areas span a plurality of tracks and a plurality of sectors, each sector associated with a sector ID, and wherein the plurality of sectors of each lower coercivity area span an angular region on a corresponding disk surface of a disk.

In some examples of the data storage device, the method, and the one or more processing devices described above, the plurality of tracks of each of the plurality of lower coercivity areas include tracks at or near an outer diameter (OD) of a corresponding disk.

Some examples of the data storage device, the method, and the one or more processing devices described above further include processes, features, means, or instructions for refraining writing data on one or more areas of the disk corresponding to the one or more mapped out sectors, and refraining reading data from the one or more areas of the disk corresponding to the one or more mapped out sectors.

In some examples of the data storage device, the method, and the one or more processing devices described above, the plurality of lower coercivity areas on the one or more disks comprise different magnetic characteristics as compared to areas of the one or more disks not affected by the plurality of sputtering claws (i.e., areas of the disk not within the sputter shadow regions).

Some examples of the data storage device, the method, and the one or more processing devices described above further include processes, features, means, or instructions for assigning a first range of logical block address (LBA) values to one or more tracks adjacent the plurality of tracks of each of the plurality of lower coercivity areas and towards an inner diameter (ID) of a corresponding disk; and assigning a second range of LBA values to the plurality of tracks of each of the plurality of lower coercivity areas.

In some examples of the data storage device, the method, and the one or more processing devices described above, the first range of LBA values include at least LBA 0 to LBA N, and wherein the second range of LBA values include LBA N+1 to LBA M, where N<M, as further described below in relation to FIG. 5B.

In some examples of the data storage device, the method, and the one or more processing devices described above, the first range of LBA values further includes LBA values that are equal to greater than LBA M+1.

In some examples of the data storage device, the method, and the one or more processing devices described above, the writing or reading data comprises writing hot data to, or reading hot data from, one or more tracks not intersected by the plurality of lower coercivity areas, wherein the hot data comprises data corresponding to logical block address (LBA) values that are at or below a LBA threshold (e.g., LBA 0 to N, where N is the threshold).

In some examples of the data storage device, the method, and the one or more processing devices described above, one or more of the plurality of tracks intersecting the at least one of the plurality of lower coercivity areas are formatted using a same or similar aerial density as a track not intersected by the at least one of the plurality of lower coercivity areas.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

As previously described, in hard disk drives or HDDs, media coercivity may vary at (or near) locations proximate to the outer diameter (OD) of a disk. In some cases, such variations in media coercivity are induced as a result of the disk drive manufacturing process. Specifically, during disk drive manufacturing, sputtering claws (e.g., shown as sputtering claws 405 in FIG. 4) are used to physically hold or support the magnetic disk during sputter deposition. In some circumstances, the sputtering claws leave a "shadowing effect" on the disk, meaning that some areas or regions of the disk (e.g., at or near the point of contact of the sputtering claws) have different sputtering film thickness, different magnetic characteristics, different media "softness", etc., as compared to the regions of the disk closer to the inner diameter (ID), further away from the sputtering claws, and/or not in contact with the sputtering claws. In some cases, the regions of the disk that are affected by the sputtering claws (i.e., during the manufacturing process) may be referred to as sputter shadow regions, sputter shadow areas, or pin shadow areas. For the purposes of this disclosure, the terms "lower coercivity areas", "sputter shadow areas", "sputter shadow regions", "pin shadow areas", and "pin shadow regions" may be used interchangeably throughout the disclosure and may be used to refer to areas of the disk with a coercivity lower than a threshold. While not necessary, in some instances, these sputter shadow areas may be located near the outer diameter of the disk. Further, the sputter shadow areas may span one or more sectors (angular) and one or more tracks (inward from the OD region of the disk).

In some cases, large variations in coercivity at different regions of the disk may adversely impact normal read/write operations. For example, the media at (or around) the pin shadow regions may be "magnetically soft" as compared to the media on other portions of the disk. While the media in the pin shadow regions is easier to write to, it is also susceptible to degradation/erasure (e.g., due to adjacent track interference or ATI). That is, an adjacent track write may inadvertently erase or degrade a previous track write (e.g., a previous track write in a sputter shadow area). In some examples, the data corresponding to the previous track write may need to be written (e.g., on the same or a different track) if it was lost during the current track write. In some circumstances, however, rewriting the lost data may adversely impact the data from another previous track write in the pin shadow region. This results in a cascading effect where multiple rewrites may need to be performed, which increases latency, reduces data integrity, or in some cases, makes the disk drive inoperable. One currently used technique for mitigating the effects of non-uniform media coercivity uses a lower aerial density (i.e., tracks per inch or TPI) near the outer diameter (OD) of the disk. While this may help reduce the effects of adjacent track interference (ATI), it also reduces the amount of data that can be written to the disk (i.e., since the low aerial density or TPI is not limited to the pin shadow regions, but everywhere in the vicinity of the OD). Furthermore, such a design also results in achievable capacity loss (also referred to as ACC loss) and provides little to no mitigation against poor writes.

Broadly, aspects of the present disclosure are directed to a refined technique for enhancing aerial density in which one or more sector IDs in the sputter shadow areas (i.e., pin shadow regions) are mapped out, which not only helps reduce or minimize ATI but also helps against poor writes, as compared to the prior art. In some examples, one or more sector IDs of every other track are mapped out (i.e., cross track). In some other cases, the sector IDs of every third track are mapped out cross track in the one or more sputter shadows areas. As used herein, the term "mapping out" means that data is not written to/read from the mapped-out sector IDs in the sputter shadow area(s). Since the sputter shadow areas correspond to a relatively small angular section (e.g., a few percent) of the disk, mapping out the sector IDs does not drastically impact the storage capacity of the disk, as compared to the prior art. Furthermore, mapping out of the sector IDs also allows a higher aerial density (or TPI) to be used near the OD of the disk, as compared to the prior art. In some cases, a write may be deemed as "poor" when it has a low SNR (e.g., SNR is below a threshold) after it has been completed and/or requires data recovery procedures in order to be read. In some other cases, a poor write may be readable immediately after completion, but may require data recovery procedures after one or more SNR degrading events occur (e.g., ATI and/or track squeeze, to name two non-limiting examples).

Figure 2A:
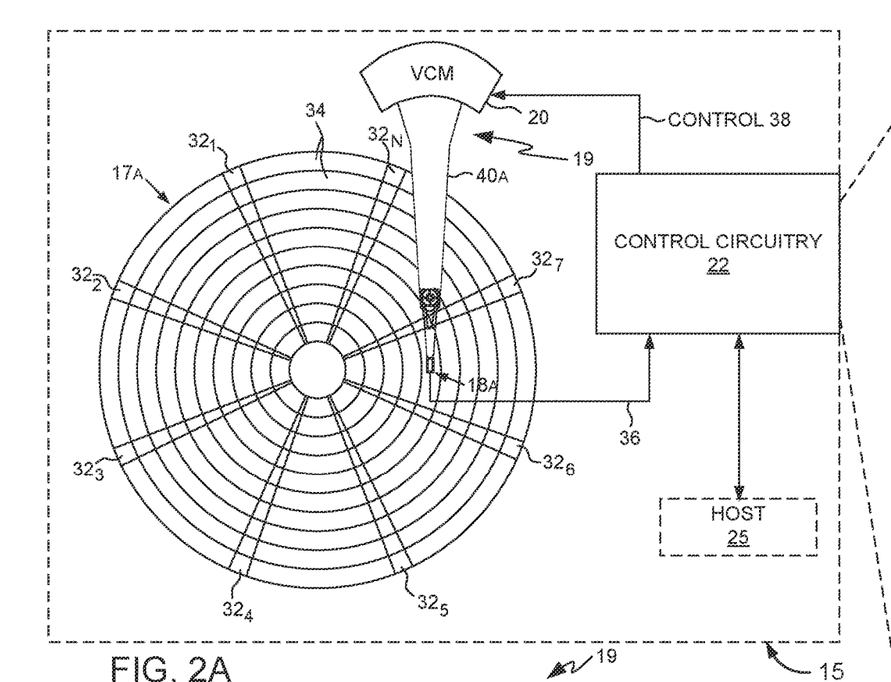
FIGS. 2A and 2B illustrate conceptual block diagrams of a top view and a side view of a data storage device in the form of a disk drive, according to various aspects of the present disclosure.
Figure 2B:
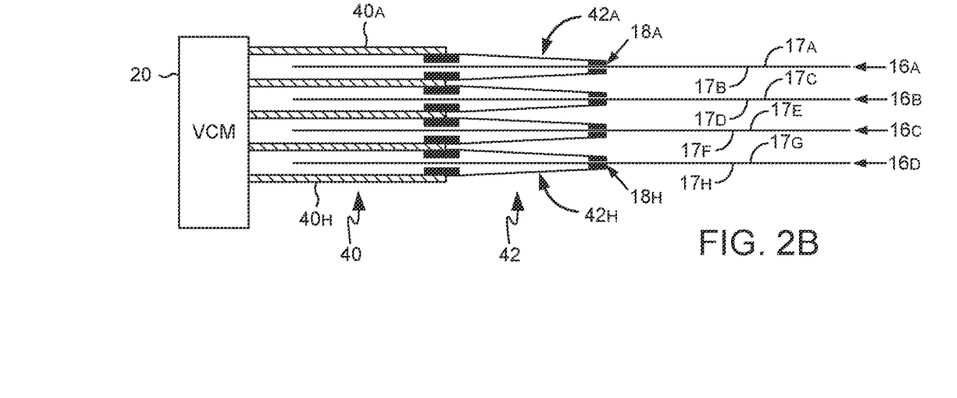
Figure 2C:
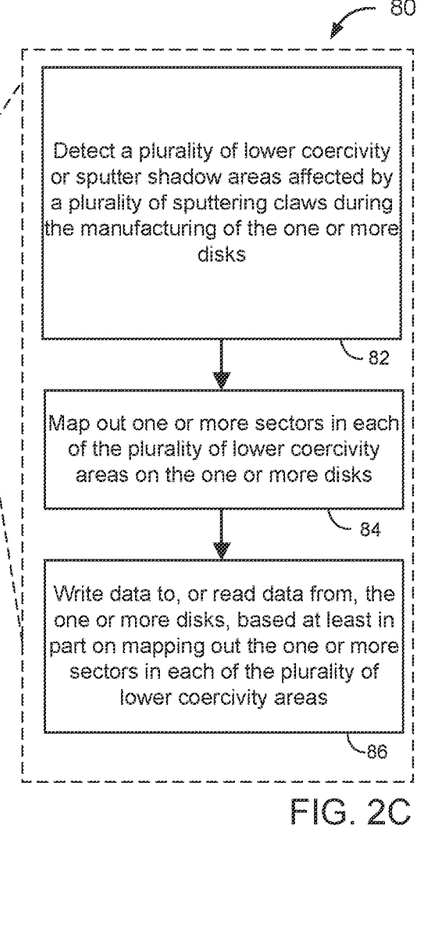
FIG. 2C illustrates a method that a data storage device may perform, execute, and implement, in accordance with aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16. In some examples, host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors $32_1$ through $32_N$) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) (e.g., shown as ID 301 in FIG. 3) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

In some examples (82), the control circuitry 22 is configured to control the actuation of the primary actuator (i.e., VCM). Further, the VCM is configured to actuate the head 18 over the disk surfaces 17. In some embodiments, actuation of the head 18 over the disk surfaces (e.g., on tracks at or near the OD region of the disk) may enable detection of the sputter shadow areas of the disk. Specifically, the sputter shadow areas may be detected by measuring one or more metrics (e.g., overwrite or OW, magnetic write width or MWW, write and erase width or WEW, magnetic read width or MRW, servo variable gain amplifier or SVGA information, symbol error rate or SER, to name a few non-limiting examples) for a plurality of tracks in the OD region of the disk. The control circuitry 22 is also configured to detect a plurality of lower coercivity areas (e.g., sputter shadow areas/regions) affected by a plurality of sputtering claws during the manufacturing of the one or more disks (82), map out one or more sectors in each of the plurality of lower coercivity areas on the one or more disks (84), and write data to, or read data from, the one or more disks, based at least in part on mapping out the one or more sectors in each of the plurality of lower coercivity areas (86). In some examples, the writing or reading data (86) comprises writing data to, or reading data from, one or more sectors of the one or more disks that are not mapped out. For example, the control circuitry 22 may be configured to refrain writing data on one or more areas of the disk corresponding to the one or more mapped out sectors and/or refrain reading data from the one or more areas of the disk corresponding to the one or more mapped out sectors.

In the embodiment of FIG. 2A, the control circuitry 22 may also process a read signal 36 emanating from the head 18 to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the BEMF voltage generated by the VCM 20 during a calibration seek (where the BEMF voltage represents an estimated velocity of the VCM). The bootstrap spiral track is then written to the disk using the feed-forward compensation.

Figure 3:
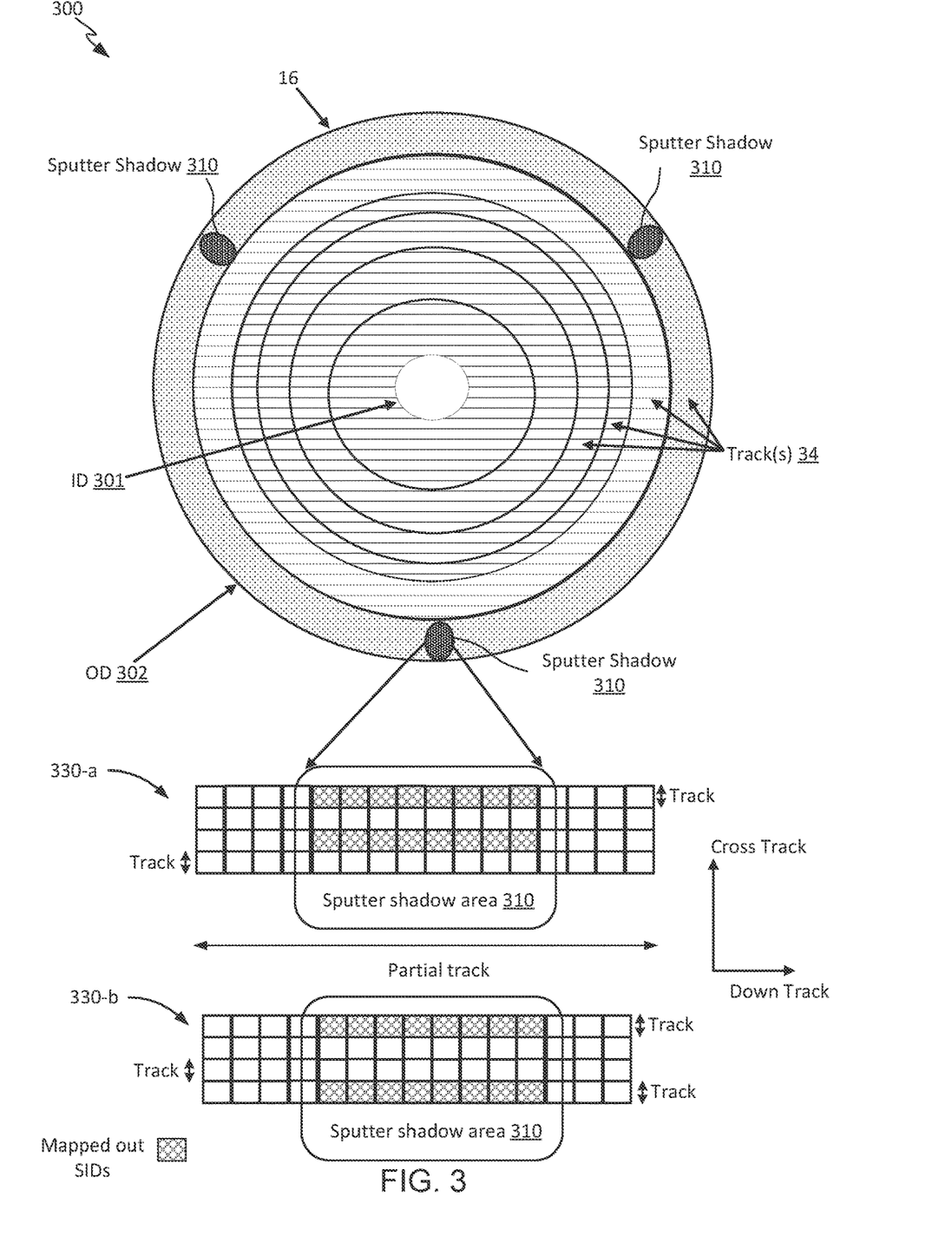
FIG. 3 illustrates a conceptual diagram of a top view of a data storage device in the form of a disk drive showing sputter shadow areas created during manufacturing of the disk drive, as well as two example mapout configurations for mapping out sector IDs in the sputter shadow areas, according to various aspects of the present disclosure.

FIG. 3 illustrates a conceptual diagram of a top view of a data storage device 300 in the form of a disk drive showing sputter shadow areas 310 created during manufacturing of the disk drive, according to various aspects of the disclosure. The disk drive (or data storage device 300) in FIG. 3 may be similar or substantially similar to the disk drive 15 previously described in relation to FIG. 2A. As seen, the data storage device 300 comprises a disk 16 (e.g., a magnetic disk) comprising a plurality of evenly-spaced, concentric tracks 34, where tracks 34 are similar or substantially similar to the ones described in relation to FIG. 2A. In some examples, the tracks 34 are also referred to as data tracks 34. FIG. 3 also shows the inner diameter (ID) 301 and the outer diameter (OD) 302 of the disk 16, as well as the sputter shadow areas 310 located at (or near) the OD region 302 of the disk. While FIG. 3 shows a plurality of concentric tracks 34, it should be noted that the number and location of tracks is exemplary only. In some examples, the sputter shadow areas 310 (dark dotted region in FIG. 3) near the OD region of the disk 16 may span a plurality of tracks 34, not just a single track 34. As noted above, in some circumstances, the sputter shadow areas 310 may have a different media coercivity (Hc), magnetic "softness", etc., as compared to other portions of the disk (e.g., the regions of the disk 16 shaded with the horizontal stripes and/or the light dots in FIG. 3).

FIG. 3 also illustrates a detailed view of the sputter shadow area 310 and two alternate mapout configurations 330-*a* and 330-*b* for mapping out sector IDs, in accordance with one or more implementations. In some examples, the sputter shadow area(s) 310 span a plurality of tracks (e.g., directed inward from the OD region) and a plurality of sectors (i.e., angular). In one non-limiting example, shown by way of option 330-*a*, the sector IDs of every other track in the sputter shadow area 310 may be mapped out cross-track. Mapping out sector IDs in the sputter shadow area(s) of the disk facilitates a more uniform and/or higher media coercivity (Hc) around the track(s), which in turn facilitates in reducing or minimizing adjacent track interference (ATI) levels in those areas. In some aspects, mapping out the sector IDs in the sputter shadow area(s) may not only enable the use of a higher aerial density (or TPI), but also serve to reduce ATI levels, as compared to the prior art. Typically, a higher TPI results in higher ATI. However, in accordance with aspects of the disclosure, the lower ATI levels achieved as a result of mapping out sectors (or sector IDs) in the pin shadow regions may help balance out the higher ATI levels typically seen with a higher aerial density. Accordingly, the net aerial density of the disk drive may be increased while keeping the ATI at an acceptable level (e.g., under a predefined threshold).

In some other cases, shown by way of option 330-*b*, mapping out sector IDs may comprise mapping out (e.g., not using for reading/writing user data) a plurality of sectors cross track on every third track. In some circumstances, the reduction in ATI levels may be based in part on the map out option/configuration (e.g., option 330-*a*, option 330-*b*) utilized. For instance, mapping out sector IDs on every other track (option 330-*a*) facilitates in reducing ATI to very low or even negligible levels. Further, mapping out sector IDs on every third track (option 330-*b*) may allow ATI levels to be reduced by 50% or more and/or help ensure that the ATI is single-sided (as opposed to double sided). As can be appreciated, single side ATI is "easier" to handle/adjust for as compared to double sided ATI. This may help reduce latency, error rates, or a combination thereof, as compared to the prior art.

Thus, mapping out sector IDs may help reduce the variations in media coercivity for regions of the disk used for storing data. In some aspects, smaller variations in media coercivity (Hc) may also allow optimization of one or more other parameter values (e.g., write parameters, such as write current or lw, channel parameters, etc.) used during normal operation of the disk drive, which may yield further enhancements in aerial density. In some embodiments, the optimal parameter values may be determined for individual tracks, or alternatively, for groups of tracks (e.g., zones, notches, etc.), the latter of which serves to reduce test time. In one non-limiting example, optimization of parameter values may comprise determining an optimal write current or lw for hard and soft media. For example, a lower write current (lw) may be used while writing data on soft media, as compared to hard media.

Figure 4:
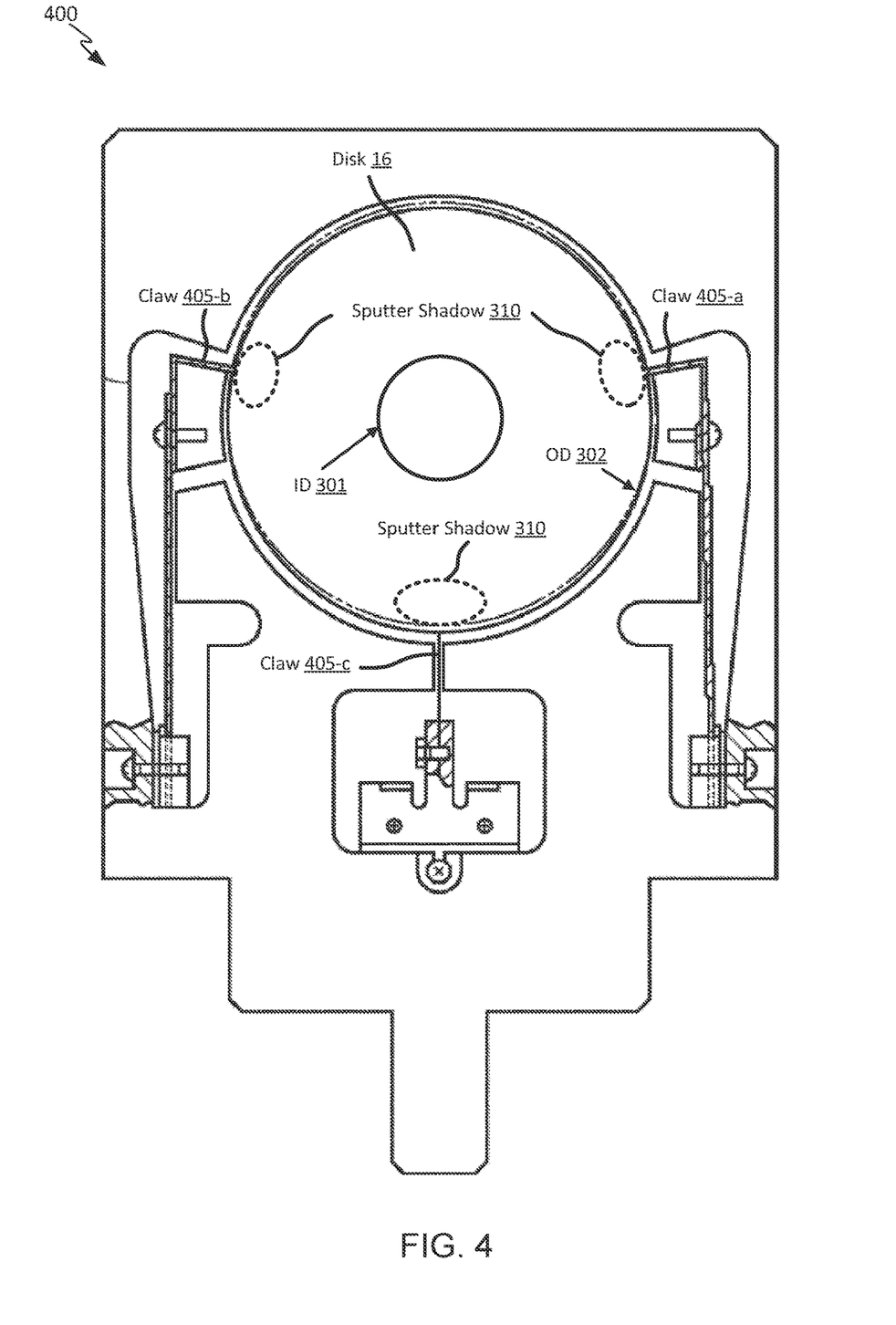
FIG. 4 illustrates a conceptual diagram of a top view of the disk in FIG. 3, where the disk is supported by a plurality of sputtering claws or prongs which create areas of different media coercivity on the disk, according to various aspects of the present disclosure.

Turning now to FIG. 4, which illustrates a conceptual diagram 400 of a top view of the disk 16 in FIG. 3, where the disk 16 is supported by a plurality of sputtering claws 405 (or prongs 405) which create areas of different media coercivity on the disk, according to various aspects of the present disclosure. As seen, FIG. 4 depicts the disk 16 loaded on a tool used for sputter film deposition, where the disk 16 is held in place by three sputtering claws 405-*a*, 405-*b*, and 405-*c*. It should be noted that, the number of sputtering claws 405 is not intended to be limiting and different number of sputtering claws (e.g., 2, 4, 5, etc.) may be utilized in different embodiments. Regardless of the number of sputtering claws utilized during manufacturing, aspects of the disclosure support detection of one or more sputter shadow areas on the disk surface, based on measuring one or more metrics (e.g., symbol to error ratio or SER) for tracks at or near the OD region of the disk. As can be appreciated, aspects of the disclosure may be employed for detecting areas/regions of a disk having different media coercivity and compensating for adverse effects (e.g., ATI) associated with such variations in media coercivity, regardless of how such variations arose and/or where such variations exist. That is, variations in media coercivity (Hc) on a disk surface may arise for different reasons (i.e., not just due to the use of sputtering claws for sputter film deposition) and at different regions (i.e., other regions besides the OD region), and similar principles disclosed herein may be applied to compensate for the same.

Figure 6:
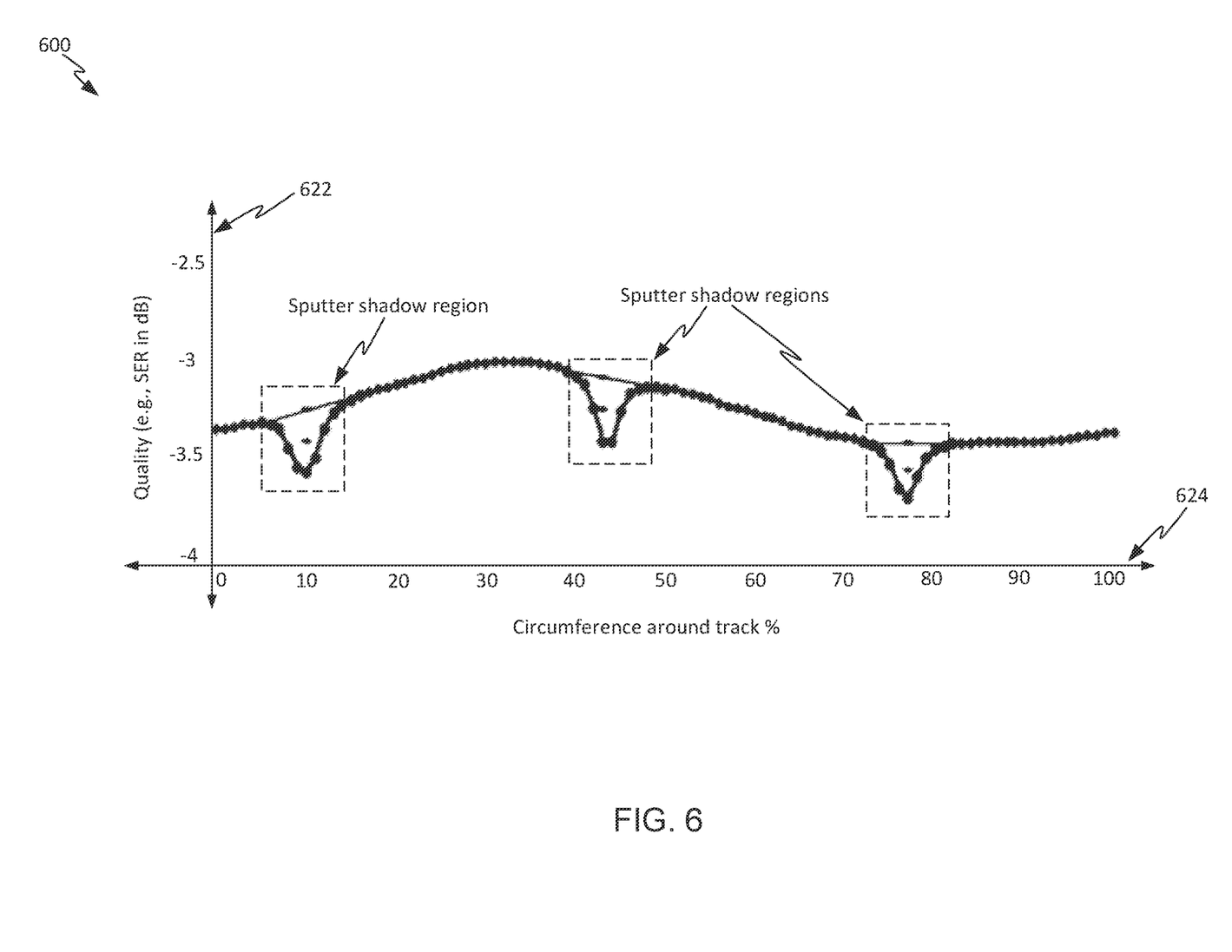
FIG. 6 illustrates an example of a conceptual graph showing how media quality (e.g., symbol to error ratio or SER) changes in the sputter shadow regions of a track, or a disk drive, according to various aspects of the disclosure.

FIG. 4 also shows the ID 301 and the OD 302 of the disk, as well as a plurality of sputter shadow areas 310 created by the sputtering claws 405. The sputter shadow areas 310 in FIG. 4 may be similar or substantially similar to the sputter shadow areas 310 described in relation to FIG. 3 and may be located near the OD region of the disk. In some cases, media coercivity (Hc) may vary substantially at the OD of an HDD platter. FIG. 6 illustrates a graph 600 of media quality (on the vertical or y-axis 622) against distance around a track, where the track intersects one or more sputter shadow regions. One non-limiting example of the media quality shown on the y-axis 622 may include a symbol to error ratio (SER). Further, the horizontal or x-axis 624 corresponds to a circumference around the track (e.g., in %). As such, the graph 600 depicts the media quality for each sector (or sector ID) of a track, where at least a portion of sector IDs of the track are in the sputter shadow regions of the disk. In some aspects, the conceptual graph 600 shows how the media quality (e.g., symbol-to-error ratio or SER) drastically (or abruptly) changes in the sputter shadow regions of a track, or a disk drive. As seen in FIG. 6, there are three distinct dips in media quality (or media coercivity) at the pin shadows created by the prongs (e.g., sputtering claws 405 in FIG. 4) used to hold the media/disk 16 during sputtering. In the example shown, the media in the pin shadows (or sputter shadow regions) has a lower coercivity and/or is of lower quality than the rest of the disk/media at the same radius. In some circumstances, this effect may extend inward for approximately 30K-60K (i.e., 30,000-60,000) tracks. Because of this reduced media coercivity (or Hc), the media in the pin shadows is more vulnerable to adjacent track interference (ATI) than media at other angular positions (i.e., not within the pin shadows) or further into the disk (i.e., media that is closer to the ID 301).

As noted above, currently used techniques for mitigating the effects of increased ATI in the sputter shadow regions typically rely on increasing track spacing for the plurality of tracks intersecting the pin shadows until the ATI levels are acceptable (e.g., below a threshold). Oftentimes, however, this approach results in a sizable reduction in TPI and loss of aerial density, which in turn results in a lower achievable capacity (ACC). In some other cases, ATI tracking in the sputter shadow region(s) may be enhanced using one or more of the following approaches: (1) using damage multipliers based on whether a track write crosses the angular position of a pin shadow/sputter shadow, (2) more detailed ATI tracking through the use of additional XCOR bins, more bits/bin, or a combination thereof, to mitigate the increased ATI refresh load. With regards to (1), if the media is soft, a larger damage multiplier value may be utilized to increase the amount of ATI damage accounted for. Additionally, with regards to (2), areas of the disk with "soft" media may be tracked in more detail, as compared to areas of the disk with harder media, because of the increased damage associated with magnetically soft areas of the disk. In some aspects, the cost of over-accounting for damage is also higher in the magnetically soft areas of the disk/media due to the increased damage in such areas, hence more accurate ATI tracking may be needed while writing/reading data in these areas. However, neither of these approaches, i.e., (1) and (2), changes the fact that the media in the pin shadow/sputter shadow regions is still deficient (e.g., magnetically different, has a lower media coercivity Hc, is more susceptible to ATI, to name a few) and that TPI relaxation is needed, nonetheless.

Aspects of the present disclosure facilitate in enhancing overall storage capacity, TPI, and/or aerial density, as compared to the prior art, by trading out a small number of mapped out sectors (or sector IDs) in the sputter shadow regions for a net increase in TPI.

Figure 5A:
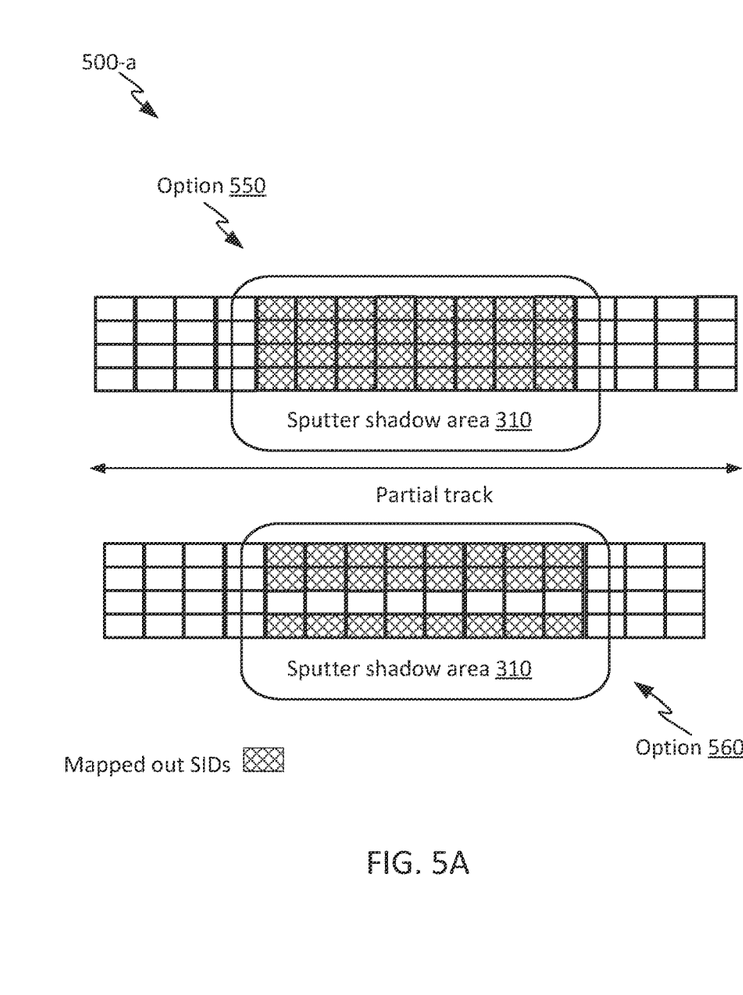
FIG. 5A illustrates two options for enhancing aerial density of a disk drive by mapping out sector IDs in sputter shadow areas on the disk drive, according to various aspects of the present disclosure.

FIG. 5A illustrates a conceptual view 500-a of a plurality of tracks of a disk drive, where the plurality of tracks intersect a sputter shadow area 310 on the disk, in accordance with one or more implementations. In the example shown, FIG. 5A depicts two additional mapout options 550 and 560 that may be used in lieu of options 330-a (mapping out sector IDs of every other track) and 330-b (mapping out sector IDs of every third track), previously described in relation to FIG. 3. In some examples, mapping out sectors or sector IDs in the sputter shadow area 310 may comprise mapping out (i.e., not using for reading/writing purposes) sectors on each track, as shown in option 550. In some other cases, the sectors or sector IDs may be mapped out in an asymmetrical manner, as shown in option 560, where the sector IDs of three out of every four tracks is mapped out. In yet other cases, the sector IDs of two out of every three tracks may be mapped out (not shown). It is contemplated that the mapping out option (e.g., option 330-a, option 330-b, option 550, option 560) utilized may vary depending on the acceptable ATI level, write/refresh ratio threshold (e.g., 8, which implies that 7 post-writes are needed before refreshing), a sputter shadow multiplier threshold (e.g., <2, <3), latency requirements, and/or overall aerial density requirements, to name a few non-limiting examples. For instance, while option 550 facilitates in removing ATI and/or near track interference (NTI), it also reduces the overall aerial density and/or storage capacity as compared to options 330-a and 330-b. Similarly, while option 330-a corresponds to a lower net aerial density as compared to option 330-b, it allows for a lower ATI. Specifically, option 330-a may serve to remove ATI (e.g., both single and double-sided ATI), while option 330-b may be limited to removing double sided ATI (i.e., single sided ATI may still be present if option 330-b is employed).

Figure 5B:
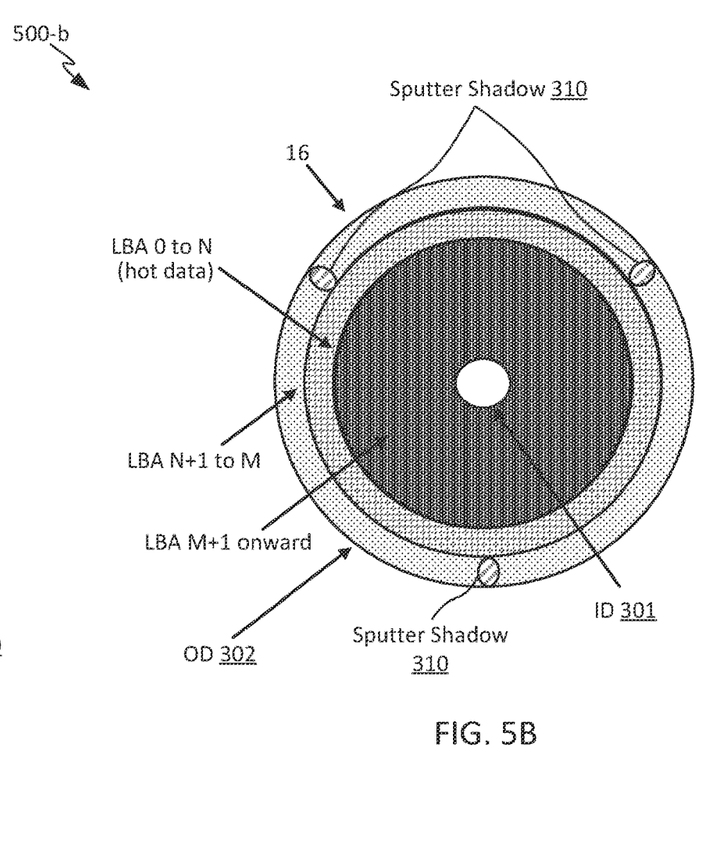
FIG. 5B illustrates an alternate option for mitigating against ATI in sputter shadow areas of a disk so as to enhance disk drive performance by moving logical block addresses (LBA) inward or away from an outer diameter (OD) of the disk, according to various aspects of the present disclosure.

FIG. 5B illustrates an alternate option (500-b) for mitigating the effects of sputter shadows on disk drive performance, in accordance with one or more implementations. In this example, ATI mitigation is provided by moving lower logical block addresses (LBA) inward or away from an outer diameter (OD) of the disk. In some circumstances, low LBAs (e.g., LBA 0-N, where N<M) may be used more often than other areas corresponding to higher LBAs (e.g., LBA N+1 to M) for reading/writing data. In such cases, moving LBA 0 inward (i.e., towards the ID 301) and assigning higher LBAs to the extreme OD region of the disk 16 may facilitate in (1) reducing ACC loss and/or (2) hot data avoidance (i.e., prevent hot data corresponding to LBA 0 to N from being stored on the tracks near the OD region of the disk that intersect with the sputter shadow areas 310). In this way, moving LBA 0 inward and assigning the extreme OD to a higher LBA range may reduce the likelihood of data degradation due to ATI. As used herein, the term "hot data" may refer to data that is more frequently accessed (e.g., for read or write purposes) than average. In one non-limiting example, hot data may be accessed <10 times more frequently than average.

In some embodiments, sputter shadow areas, such as sputter shadows 310, may be detected through the use of one or more screening metrics that are used by the drive or an external measurement system coupled to the drive (e.g., for measuring over-write or OW, magnetic core width or MCW, servo variable gain amplifier/stepped variable gain amplifier or SVGA, symbol error rate or SER by sector ID data, to name a few). In some cases, these screening metrics may also help detect the severity (e.g., susceptibility to ATI) of the different sputter shadow areas, as different sputter shadow areas may have different degrees of severity. In some cases, the sputter shadow areas may be identified by measuring a plurality of tracks at the OD area of a disk. Further, the severity of the sputter shadow areas may be determined based on one or more of the adjacent track interference or ATI, OW, SVGA, SER, etc. Further, detecting the sputter shadows 310 may also comprise determining the size of each sputter shadow area, where the size may include the number of servo tracks (cross-track) and number of sector IDs (down track). In some cases, the control circuitry 22 selects a mitigation method (e.g., mapout option 330-a, 330-b, 550, or 560, or moving LBA 0 inward) based on the category, severity, and/or size of the sputter shadow region(s).

In some examples, aspects of the present disclosure are also directed to measuring one or more metrics for detecting the one or more sputter shadow areas created during manufacturing of a disk, storing information related to the sputter shadow areas in a look up table (or another applicable data structure) or by filling in record IDs, and using the sputter shadow record ID (RID) as an input for mapping out one or more sector IDs in the sputter shadow/pin shadow areas. In some examples, the sputter shadow mapout RID may be used to generate a sputter shadow table, where the sputter shadow table includes information pertaining to the read/write head(s), notches, start/end sector ID, as well as the mapout configuration (e.g., if every track, every other track, or every third track is mapped out) selected for each sputter shadow area. In some examples, the sputter shadow table may comprise a look-up table (or another applicable data structure) for determining what sputter shadow multiplier should be used for a particular sputter shadow area (or alternatively, for a portion of a sputter shadow area). While not necessary, in some cases, the same mapout configuration (e.g., sectors or sector IDs of every other track are mapped out) may be used for all sputter shadow areas of the disk. In other cases, a different mapout configuration may be used for different pin shadow regions of the disk (e.g., all sector IDs of all tracks within a first sputter shadow area are mapped out, all sector IDs of every other track within a second sputter shadow area are mapped out, and all sector IDs of every third track within a third sputter shadow are mapped out, to name one non-limiting example).

In some embodiments, the sputter shadow RID structure may include one or more headers (e.g., a generic header, such as a header for a RID; a sputter shadow header including information for indicating whether mapout is on/off, a conventional magnetic recording or CMR mapout frequency, a shingled magnetic recording or SMR mapout frequency) and sputter shadow SID information (e.g., by recording type, such as conventional magnetic recording or CMR, shingled magnetic recording or SMR; by physical head; by notch, by sputter shadow pin, where each pin includes a start sector ID and end sector ID). It should be noted that, other applicable information besides the ones listed above may be included in the sputter shadow RID structure and the examples listed herein are not intended to be limiting.

In this way, aspects of the present disclosure enable mapping out one or more sectors (or sector IDs) of one or more tracks, where (1) the one or more tracks intersect the sputter shadow areas and (2) the one or more mapped out sectors or sector IDs are in the sputter shadow areas. Further, mapping out the one or more sectors (or sector IDs) allows the HDD to refrain writing data to and/or reading data from the portions of the track corresponding to the mapped-out sectors. Such a design facilitates in optimizing HDD performance, enhancing aerial density, reducing ATI, or a combination thereof, as compared to the prior art.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for sector mapout of low coercivity media for enhancing aerial density for data storage, and other aspects of this disclosure. Persons skilled in the relevant fields of art will be well-equipped by this disclosure with an understanding and an informed reduction to practice of a wide panoply of further applications, architectures, techniques, and methods for sector mapout of low coercivity media for enhancing aerial density for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
    one or more disks;
    an actuator assembly comprising one or more disk heads; and
    one or more processing devices, configured to:
        map out one or more sectors on the one or more disks in at least one of a plurality of lower coercivity areas with a coercivity lower than a threshold, wherein each of the plurality of lower coercivity areas spans a plurality of tracks on a corresponding disk surface of the one or more disks, and wherein mapping out the one or more sectors comprises mapping out a plurality of sectors cross-track in the at least one of the plurality of lower coercivity areas;
        write data to, or read data from, the one or more disks, based at least in part on mapping out the one or more sectors in the at least one of the plurality of lower coercivity areas, and wherein the writing or reading data comprises:
            writing data to, or reading data from, one or more sectors of the one or more disks that are not mapped out.

2. The data storage device of claim 1, wherein mapping out the plurality of sectors cross-track comprises:
    mapping out sectors of each angular region of a plurality of angular regions on the corresponding disk surface of the one or more disks, and wherein each angular region corresponds to one lower coercivity area of the plurality of lower coercivity areas.

3. The data storage device of claim 2, wherein the plurality of tracks intersecting the at least one of the plurality of lower coercivity areas are formatted using a same or similar aerial density as a plurality of tracks not intersected by the at least one of the plurality of lower coercivity areas.

4. The data storage device of claim 1, wherein mapping out the plurality of sectors cross-track comprises:
    mapping out, for every other track, sectors in each of the plurality of lower coercivity areas, or
    mapping out, for every third track, sectors in each of the plurality of lower coercivity areas.

5. The data storage device of claim 1, wherein each of the plurality of lower coercivity areas span a plurality of tracks and a plurality of sectors, each sector associated with a sector ID, and wherein the plurality of sectors of each lower coercivity area span an angular region on a corresponding disk surface of a disk.

6. The data storage device of claim 5, wherein the plurality of tracks of each of the plurality of lower coercivity areas include tracks at or near an outer diameter (OD) of a corresponding disk.

7. The data storage device of claim 6, wherein the one or more processing devices are further configured to:
  assign a first range of logical block address (LBA) values to one or more tracks adjacent the plurality of tracks of each of the plurality of lower coercivity areas and towards an inner diameter (ID) of the corresponding disk; and
  assign a second range of LBA values to the plurality of tracks of each of the plurality of lower coercivity areas.

8. The data storage device of claim 7, wherein the first range of LBA values include at least LBA 0 to LBA N, and wherein the second range of LBA values include LBA N+1 to LBA M, where N<M.

9. The data storage device of claim 8, wherein the first range of LBA values further includes LBA values that are equal to greater than LBA M+1.

10. The data storage device of claim 1, wherein the one or more processing devices are further configured to:
  refrain writing data on one or more areas of the disk corresponding to the one or more mapped out sectors; and
  refrain reading data from the one or more areas of the disk corresponding to the one or more mapped out sectors.

11. The data storage device of claim 1, wherein the writing or reading data comprises:
  writing hot data to, or reading hot data from, one or more tracks not intersected by the plurality of lower coercivity areas, and wherein the hot data comprises data corresponding to logical block address (LBA) values that are at or below a LBA threshold.

12. A method of operating a data storage device, comprising:
  mapping out, by one or more processing devices, one or more sectors in each of a plurality of lower coercivity areas with a coercivity lower than a threshold on one or more disks, wherein each of the plurality of lower coercivity areas spans a plurality of tracks on a corresponding disk surface of the one or more disks, and wherein mapping out the one or more sectors comprises mapping out a plurality of sectors cross-track in the at least one of the plurality of lower coercivity areas; and
  writing data to, or reading data from, the one or more disks, based at least in part on mapping out the one or more sectors in each of the plurality of lower coercivity areas, and wherein the writing or reading data comprises:
    writing data to, or reading data from, one or more sectors of the one or more disks that are not mapped out.

13. The method of claim 12, wherein mapping out the plurality of sectors cross-track comprises one of:
  mapping out sectors of each angular region of a plurality of angular regions on the corresponding disk surface of the one or more disks, wherein each angular region corresponds to one lower coercivity area of the plurality of lower coercivity areas, or
  mapping out, for every other track, sectors in each of the plurality of lower coercivity areas, or
  mapping out, for every third track, sectors in each of the plurality of lower coercivity areas.

14. The method of claim 12, wherein,
  each of the plurality of lower coercivity areas span a plurality of tracks and a plurality of sectors, each sector associated with a sector ID,
  the plurality of sectors of each lower coercivity area span an angular region on a corresponding disk surface of a disk, and
  the plurality of tracks of each of the plurality of lower coercivity areas include tracks at or near an outer diameter (OD) of a corresponding disk.

15. The method of claim 14, wherein the plurality of tracks intersecting the at least one of the plurality of lower coercivity areas are formatted using a same or similar aerial density as a plurality of tracks not intersected by the at least one of the plurality of lower coercivity areas.

16. The method of claim 12, further comprising:
  refraining writing data on one or more areas of the disk corresponding to the one or more mapped out sectors; and
  refraining reading data from the one or more areas of the disk corresponding to the one or more mapped out sectors.

17. The method of claim 12, wherein the writing or reading data further comprises:
  writing hot data to, or reading hot data from, one or more tracks not intersected by the plurality of lower coercivity areas, and wherein the hot data comprises data corresponding to logical block address (LBA) values that are at or below a LBA threshold.

18. One or more processing devices comprising:
  means for mapping out one or more sectors in each of a plurality of lower coercivity areas with a coercivity lower than a threshold on one or more disks, wherein each of the plurality of lower coercivity areas spans a plurality of tracks on a corresponding disk surface of the one or more disks, and wherein the means for mapping out the one or more sectors further comprises means for mapping out a plurality of sectors cross-track in the at least one of the plurality of lower coercivity areas; and
  means for writing data to, or means for reading data from, the one or more disks, based at least in part on mapping out the one or more sectors in the at least one of the plurality of lower coercivity areas, and wherein the means for writing or reading data comprises:
    means for writing data to, or means for reading data from, one or more sectors of the one or more disks that are not mapped out.

19. The one or more processing devices of claim 18, wherein the means for mapping out of the plurality of sectors cross-track further comprises:
  means for mapping out sectors of each angular region of a plurality of angular regions on the corresponding disk surface of the one or more disks, and wherein each angular region corresponds to one lower coercivity area of the plurality of lower coercivity areas, or
  means for mapping out, for every other track, sectors in each of the plurality of lower coercivity areas, or
  means for mapping out, for every third track, sectors in each of the plurality of lower coercivity areas.

20. The one or more processing devices of claim 18, further comprising:
  means for refraining writing data on one or more areas of the disk corresponding to the one or more mapped out sectors; and means for refraining reading data from the one or more areas of the disk corresponding to the one or more mapped out sectors.

21. The one or more processing devices of claim 18, wherein the means for writing or reading data comprises:
means for writing hot data to, or means for reading hot data from, one or more tracks not intersected by the plurality of lower coercivity areas, and wherein the hot data comprises data corresponding to logical block address (LBA) values that are at or below a LBA threshold.

* * * * *